United States Patent Office 3,320,082
Patented May 16, 1967

3,320,082
COLLOIDAL SILICA PROTECTIVE COATING AND METHOD OF MAKING SAME
Walter Michael McMahon, La Habra, and Gabriel H. Law, Pasadena, Calif., assignors to American Pipe and Construction Co., Los Angeles, Calif., a corporation of Delaware
No Drawing. Filed Jan. 30, 1963, Ser. No. 257,807
13 Claims. (Cl. 106—287)

This invention relates to protective coatings for ferrous metals. More particularly, the coatings contemplated by this invention produce dry films comprising zinc metal particles bonded together in a hard insoluble matrix, said films being a complex reaction product of zinc and lead salts with a colloidal silica. The films are deposited from an essentially aqueous mixture of finely divided zinc dust (which in most instances is modified by the addition of pigment grade red lead), a silica colloidally dispersed and stabilized in water, and a water miscible organic amine.

The invention especially contemplates protective coatings of the kind described, including small amounts of urea and alkali metal dichromate.

An important aspect of coatings herein described is that they form hard films, set without the application of heat or a chemical wash, and are insoluble in water as well as in many organic liquids. Moreover, the resistance of the self-cured dried film of the present invention to water, water vapor and to heat recycling is far beyond that which would be expected as compared with the baking treatment followed for curing certain conventional films.

Protective coatings comprising reaction products of alkali metal silicates with finely divided metals or mixtures of such finely divided metals have been widely adopted for the protection of exposed surfaces of iron and steel. Such coatings have proved to be particularly valuable in imparting resistance to weathering and to corrosion. One type of silicate protective coating is marketed under the brand name "Dimetcote," but coatings of this general character are also described in United States Patents Nos. 2,462,763 and 2,440,969. These coatings are applied by conventional methods and after application may be converted to a hard, water-insoluble film either by a baking treatment at temperatures from about 200° F. to about 500° F., or by treating with a suitable curing agent. The commonly used curing agents include both aqueous and non-aqueous solutions of salts capable of yielding an acid radical in the presence of the silicate coating film. The acid radical reacts with the film to produce a hard insoluble coatings.

Whereas conventional silicate films require essentially complete dehydration by baking at high temperatures to achieve insolubilization, or neutralization by an acid wash, it has been found that films formed as a reaction product of the present invention are such that the aforementioned curing treatments injure the films. Colloidal silicate particles are negatively charged ions, and with positively charged metallic ions (as derived from zinc and red lead) they form an insoluble matrix. Either neutralizing the charge on the silica with acid or dehydrating the film before metal salts can be formed results in soft non-adherent coatings.

The present coating composition may be applied as a primer to protect the underlying metal surface against corrosion and, as a result of the amine chemical modification of the colloidal silica, it possesses outstanding resistance to weathering and corrosion, is completely adherent and shows no flaking tendency. As a primer it is particularly well adapted to serve as a base coat for conventional formulations of exterior synthetic resin-based paints. No special overcoat finish is required and topcoat adhesion is achieved with vinyl resins, epoxy resins, urea resins, phenolic resins, melamine resins and alkyd resins, these alone or in a mixture.

In the absence of the critical addition of an effective amount of water miscible organic amine, a wholly inorganic aqueous coating composition containing colloidal silicate particles, zinc and red lead tends to dry so rapidly as to crack. Furthermore, compositions which do not contain an organic amine do not exhibit the outstanding resistance to water and water vapor.

The typical colloidal silica which is used in accordance with the invention is an alkali stabilized colloidal silica. This alkali stabilized colloidal silica sol is a unique material and does not resemble any other common inorganic colloidal dispersion. A very important property of such a colloidal silica is that the silica is irreversibly precipitated. Once the colloidal silica is dispersed, in water for example, and dried, it becomes irreversible and cannot be redispersed.

The colloidal silica particles are in the .01 to .03 micron range and must be stabilized by hydroxyl ions in order to remain dispersed in the aqueous medium. These hydroxyl ions can be supplied by the addition to the medium of limited amounts of hydroxides or weak acid salts of alkali metals, ammonia, miscible organic amines or combinations of these. Ammonia is not satisfactory for the purposes of this invention since it catalyzes the rapid formation of zinc salts which results in almost instantaneous gelling of the mixture upon addition of the metallic component.

The colloidal silica used herein is described in detail in U.S. Patents Nos. 2,244,325, issued June 3, 1941; 2,574,902, issued Nov. 13, 1951, and 2,597,872, issued May 27, 1952, and may be prepared by passing alkali metal silicate through an ion exchange resin to remove the alkali as described in U.S. Patent No. 2,244,325.

Sources of suitable colloidal silica are the various aquasols marketed under such tradenames as "Nalcoag," "Ludox" and "Syton." Such aquasols may be prepared by passing an alkali silicate through an ion exchange resin to remove the alkali. However, complete removal of the alkali results in unstable sols from which the silica precipitates. Stability can be attained by adding any of the hydroxyl ion-producing compounds mentioned above. Another source of silica is an "aerosil" such as "Cab-O-Sil" (Geoffrey Cobot Co.). Such a material is produced by burning silicon tetrachloride or a silane. The silica which forms is of colloidal dimensions and can be dispersed and stabilized in water to for aquasols.

In the present invention stability of the silica dispersion is greatly enhanced by the addition of a water miscible, organic amine. Although the optimum concentration of the latter may vary with its alkalinity, the effective minimum and maximum amounts are between 10 and 50 percent of the dry solids colloidal silica. Examples of amines which may be used successfully in the invention are: monoisopropanolamine, diisopropylamine, ethylenediamine, monobutylamine, isopropylamine, monoethanolamine, diethanolamine, triethanolamine, 2-amino-2 methyl-1 propanol, diethylaminopropylamine, 1,3-diaminopropane, triethylamine, tetraethylenepentamine, imino-bispropylamine, aminoethylethanolamine, N,N,N',N' tetramethyl 1,3-butanediamine, N-aminoethyl piperazine, triethylene tetramine and N-methyl morpholine. It is not our intention to restrict the invention to the aforementioned amines, but the examples given demonstrate the wide range of amines which can be used.

Less than 10% of the said organic amine is not desirable since there is not achieved the water resistant characteristics of the completely dried and self-cured film. More than about 50% of said organic amine is undesirable because of the irritating character imparted to the coating composition, e.g., irritating to the skin, hands, eyes, nose and face of the user. Furthermore, excessive amounts beyond 50% of said amine tend to cause the curing to be too rapid due to the volatility of the amine. Most water-miscible amines are quite volatile at room temperature and this volatility is ordinarily objectionable to the user, particularly under conditions where the full chemical effect is not achieved due to loss of the amine by evaporation.

In order to control the reaction between the alkaline vehicle and the zinc, compounds which have a temporary rate depressing effect must be added. If such compounds are omitted from the mixture, the latter is likely to gel and become unusable minutes after the addition of the zinc to the vehicle. We have found that relatively small amounts of lead oxide and even much smaller amounts of alkali metal chromates serve to prolong the useful life of the mixture. It has been found that combinations of these rate depressants have a synergistic effect upon the mixture, being more effective than each used alone. The lead oxide may be used in concentrations up to 300 parts and the alkali chromate up to 2 parts based on 100 parts silica solids.

An additional part of this invention involves the discovery that the coatings of the kind described, but further containing urea in amounts from 20 to 30 parts based on 100 parts of silica solids, have an accelerated rate of film hardening. The importance of this phenomenon is that enough abrasion resistance is developed by the coating after an overnight dry to permit rough handling of coated objects with a minimum delay. Furthermore, topcoats based on organic resins can be applied more quickly without danger of interfering with the hardening process of the inorganic film.

A further and unexpected advantage resulting from the combined addition of urea and said amine is a surprising reduction of the vapor pressure of the volatile water-miscible amine enhancing the control of self-curing which is governed by the amine even in cases of application on a hot summer day. Thus, in the absence of urea, there may be erratic self-curing, and, depending on the weather, non-uniform drying might be experienced, resulting in a film having a brittle surface skin, a softer inner body, and non-uniformity in its cross-sectional density. It has been found that up to 30% urea may be used to regulate self-curing of the amine modified silica binder. More than 30% makes the coating soft.

A simple and preferred method of formulation consists of preparing a clear vehicle containing colloidal silica solids, an aliphatic amine and urea (and thickener, if desired), the silica content of the vehicle being about 25 to 35% by weight. About 3 to 6 parts of zinc dust, or mixed zinc and red lead dust is then added to each part of the clear vehicle. Red lead may be present in an amount up to 20% of the zinc-red lead mixture.

Since the finely divided zinc dust will react to form salts in the presence of moisture, it must be packaged separately from the aqueous portion of the coating, but it is convenient and permissible to package the red lead with the zinc component. The two components are mixed together at the time of application, and the mixture becomes reactive and must be used within a period of twenty-four to forty-eight hours.

Various finely divided insoluble materials may be added to the mixture to impart color tones or to increase the consistency of the mixture. Examples of the former are aluminum dust, titanium dioxide, lead chromate, carbon black and the various iron oxides. These tinting pigments should not exceed 20 percent of zinc solids by weight. Inert extenders which improve the application characteristics of the coating are: various clays, talcs, silicates, carbonates of alkaline earth metals and mica in concentrations up to 15 percent of the zinc content by weight.

The following are examples of compositions which have been found to produce hard coatings which are strongly adherent to clean, sandblasted steel:

*Example I*

| | |
|---|---|
| Stabilized silica aquasol (50% solids) | 59.5 |
| Water | 12.6 |
| Potassium dichromate | .1 |
| Urea | 8.0 |
| Monoisopropanolamine | 6.7 |
| Magnesium carbonate | 6.7 |
| Zinc dust | 339.0 |
| Red lead | 52.7 |

*Example II*

| | |
|---|---|
| Stabilized silica aquasol (50% solids) | 59.5 |
| Water | 17.6 |
| Isopropyl alcohol | 7.2 |
| Amine modified bentonite clay | 7.2 |
| Attapulgite clay | 2.3 |
| Potassium dichromate | .1 |
| Urea | 8.0 |
| Monoisopropanolamine | 6.3 |
| Zinc dust | 332.0 |
| Red lead | 52.0 |

*Example III*

| | |
|---|---|
| Stabilized silica aquasol (50% solids) | 59.5 |
| Water | 20.0 |
| Potassium dichromate | .6 |
| Urea | 8.9 |
| Monoisopropanolamine | 14.7 |
| Carbon black | 1.6 |
| Zinc dust | 357.0 |
| Red lead | 89.2 |

*Example IV*

| | |
|---|---|
| Stabilized silica aquasol (50% solids) | 59.5 |
| Water | 12.6 |
| Potassium dichromate | .1 |
| Monoisopropanolamine | 6.7 |
| Magnesium carbonate | 6.7 |
| Zinc dust | 339.0 |
| Red lead | 52.7 |

*Example V*

| | |
|---|---|
| Stabilized silica aquasol (50% solids) | 59.5 |
| Water | 17.6 |
| Isopropyl alcohol | 7.2 |
| Amine modified bentonite clay | 7.2 |
| Attapulgite clay | 2.3 |
| Potassium dichromate | .1 |
| Monoisopropanolamine | 6.3 |
| Zinc dust | 332.0 |
| Red lead | 52.0 |

Films from Examples I, II and III and from various modifications of them have protected steel from rust in environments of extremely severe corrosion. Since finely divided zinc is a major component of the film, chemicals which attack that metal, such as acids, strong alkalies, oxidizing agents and certain metal chlorides, will shorten considerably their useful life. However, in many situations topcoats based on chemically resistant organic resins serve to protect the zinc. In such use the present invention acts as a permanent corrosion resistant primer for structural steel.

Due to the essentially inorganic nature of the product, the coatings contemplated are unaffected by immersion in such liquids as petroleum hydrocarbons, benzene derivatives, ketones, esters, alcohols, anhydrous chlorinated hydrocarbons, vegetable and mineral oils and mildly alkaline amines.

Potassium dichromate in the preferred amount shown in Examples I and II slows down the reaction between the metal dust and the alkaline clear vehicle. If too much is used, both insolubilization and hardening of the film are retarded. If too little is used, an exothermic reaction may occur when the metal dust is added to the clear vehicle with an accompanying gelling of the mixture. The maximum amount to be used is about 0.02 part of alkali chromate for each part of silica aquasol. Example III illustrates a formulation which is regarded as containing a maximum amount of potassium dichromate. Such a coating insolubilizes more slowly than the coatings of Examples I and II, and films over 5 mils thickness tend to blister if the film is exposed to condensation before it has completely cured. Also, the cured films formed by Example III are much slower in reaching their ultimate hardness.

Examples IV and V above are coatings where urea is omitted from the formula. Films formed by these examples will insolubilize in essentially the same time as those containing urea but the resulting films will remain soft for several weeks. Under conditions of rapid dry, that is, high temperature and low humidity, additional amine may be necessary to prevent cracking of the film. However, too much amine can cause blistering. It has been found that limits of the amine are between 0.1 mole and 0.4 mole to 60 parts, by weight, or 1.0 mole of dry silica. For monoisopropanol amine this ratio by weight is 7.5–30.0 parts amine to 60 parts silica.

It has been previously pointed out that various amines can be employed in preparing the coating compositions in accordance with this invention. The film curing characteristics of coatings using different amines has been observed and those characteristics are presented in the following table. The term "hydrophobic film character" in the table designates the resistance to water and water vapor and is based further upon the characteristics of film flexibility, toughness and hardness. The column of the table headed "Fumes" summarizes the irritating characteristics of the formulation when made and used.

invention therefore includes all aliphatic water-miscible amines whether highly volatile or not.

The less volatile amines, such as triethanolamine for example, having a boiling point of about 360° C., appear to be less effective for achieving rapid curing but good film resistance is nevertheless achieved. A similar slow rate is found with other tertiary amines having a longer chain length. In general, any aliphatic amine having a boiling point up to about 360° C. and an alkalinity which is equivalent to triethanolamine can be used with benefit to impart water-resistant characteristics and desirable curing rate to the film.

In the foregoing examples, the metal protecting pigment is exemplified with zinc dust mixed with red lead. There may be added to these pigments additional metal pigments such as powdered lead having a particle size varying from about 1 micron to about 15 microns.

The finely divided zinc pigment and extender compound such as lead oxide, may also have added thereto litharge, lead monoxide and lead dioxide, lead chromate, zinc oxide, iron oxide and aluminum oxide in amounts up to 15% of the zinc filler as a replacement for part of the zinc. The benefit of protection or inhibition against hydrogen gas formation is supplied in part by using compounds of lead, e.g., lead oxide, red lead, etc.

To illustrate, zinc dust having a particle size range from 2 to 15 microns can be blended with inert paint grade extenders such as mica, titanium dioxide, zinc oxide, chromic oxide, alumina, barytes, iron oxide, carbon black, etc., in a particle range of from 1 to 40 microns.

The extender may also be used with the finest particle size protective metal pigment which per se is not as useful due to its greater reactivity.

The pigments illustrated hereinabove are only a few which can be used and other such as lithopone, zinc sulfide, abestine, carbon black, ultramarine blue, hansa yellow, sienna, burnt umber, china clay, blanc fixe, chromium oxide, and chrome yellow may also be used for tinting if desired.

| Amine | Fumes | Film Cure | Hydrophobic Film Character |
| --- | --- | --- | --- |
| Monoisopropanolamine | Rather mild | Fast | Good. |
| Diisopropylamine | Very irritating | do | Fair to Good. |
| Ethylenediamine | do | do | Good. |
| Monobutylamine | do | do | Do. |
| Isopropylamine | do | do | Fair. |
| Monoethanolamine | Very mild | Fairly fast | Good. |
| Diethanolamine | do | Slow | Fair to Good. |
| Triethanolamine | do | Very slow | Do. |
| 2-amino-2-methyl, 1-propanol | Negligible | Slow | Do. |
| Diethylaminopropylamine | Rather mild | Very slow | Poor. |
| 1,3-diaminopropane | Rather irritating | Fast | Fair. |
| Triethylamine | Very irritating | Fairly fast | Do. |
| Tetraethylenepentamine | Very mild | Slow | Do. |
| Imino-bis-propylamine | do | Rather slow | Good. |
| Aminoethylethanolamine | do | Slow | Do. |
| N,N,N',N'-tetramethyl-1,3-butanediamine | Mild | do | Fair. |
| Methyl diethanolamine | Negligible | Rather slow | Do. |
| N-aminoethyl piperazine | Mild | Fairly fast | Fair to Good. |
| Triethylene tetramine | Very mild | Rather slow | Good. |
| N-methyl morpholine | Rather irritating | Very slow | Do. |
|  |  |  | Fair. |

From the foregoing table it will be seen that water-miscible aliphatic primary and secondary amines of intermediate volatility, e.g., having a boiling point of about room temperature, preferably above 40° C. and which are highly alkaline, combine the best properties for rate of curing to achieve the desired water-resistant character of the cured film. Any more volatile amine having a boiling point less than 45° C., such as trimethylamine, for example, can be used for fast curing, but the fumes are so irritating and objectionable that elaborate safety precautions are necessary to prevent harming personnel. Under conditions where coating can be carried out by machine the fume problem is of no consequence and the scope of the It is to be understood that although preferred examples have been described, various changes may be made without departing from the spirit of this invention, and each of such changes is contemplated.

Having thus described our invention, what we claim and desire to secure by Letters Patent is:

1. A protective coating composition which upon application converts under ambient temperature conditions to a hard, water insoluble film, said composition consisting essentially of a dispersion of an alkali-stabilized colloidal silica in sufficient water to give the composition the fluidity required for application, zinc dust in an amount rangg between about 8 and 15 parts zinc dust per part dry colloidal silica, lead oxide in an amount up to about 25% weight of the amount of zinc dust used, a water miscible organic amine having a boiling point up to 360° C. an amount equal to at least 10% and not more than 0% by weight of the dry colloidal silica, and an alkali metal chromate in an amount up to 0.02 part per part dry colloidal silica.

2. The coating composition as defined in claim 1 and further including urea in an amount up to 0.30 part by weight for each part of silica.

3. The coating composition as defined in claim 1 and further including lead oxide in an amount up to 3 parts by weight for each part of silica.

4. The coating composition as defined in claim 1 and finely divided red lead, there being present up to 20% red lead by weight of the mixture of red lead and zinc dust.

5. The coating composition as defined in claim 1 wherein said colloidal silica is present in an amount between 25 to 35% by weight of said water, silica, and amine.

6. The coating composition as defined in claim 1 herein said amine is mono-isopropanolamine.

7. The coating composition as defined in claim 1 herein said amine is mono-ethanolamine.

8. The coating composition as defined in claim 1, herein said amine is 1,3-diaminopropane.

9. The coating composition as defined in claim 1, herein said amine is N-amino-ethyl-piperazine.

10. A coating composition as defined in claim 1 and further containing an extender selected from the group consisting of clay, talc, mica, and silicates and carbonates of alkaline earth metals in an amount up to 15% by weight of the zinc dust.

11. A coating composition as defined in claim 1 and further containing a finely divided color toning pigment in an amount up to 20% by weight of the zinc dust, said pigment selected from a group consisting of aluminum dust, titanium dioxide, lead chromate, carbon black and iron oxide.

12. A protective coating composition according to claim 1 in which the lead oxide is present in an amount between about 15 and 25% by weight of the amount of zinc dust used.

13. A protective coating composition vehicle which when mixed with between 8 and 15 parts of zinc dust per part dry colloidal silica and applied to a ferrous metal converts under ambient temperature conditions to a hard, water insoluble film, said composition consisting essentially of water, an alkali-stabilized colloidal silica, a water miscible organic amine in an amount within the range of 10–50% by weight of the dry colloidal silica and an alkali metal chromate in an amount up to 0.02 part by weight per part of dry colloidal silica.

References Cited by the Examiner
UNITED STATES PATENTS

| | | | |
|---|---|---|---|
| 2,428,357 | 10/1947 | Cohen et al. | 106—287 |
| 2,527,329 | 10/1950 | Powers et al. | 106—287 |
| 2,768,884 | 10/1956 | Bowers | 106—14 |
| 2,803,566 | 8/1957 | Smith-Johannsen | 106—287 |
| 2,944,919 | 7/1960 | Morris et al. | 106—14 |
| 2,968,571 | 1/1961 | Lantz | 106—14 |
| 3,056,684 | 10/1962 | Lopata et al. | 106—14 |
| 3,093,493 | 6/1963 | Freyhold | 106—14 |

MORRIS LIEBMAN, *Primary Examiner.*

A. LIEBERMAN, *Assistant Examiner.*